United States Patent
Chapman et al.

(10) Patent No.: US 10,067,933 B2
(45) Date of Patent: Sep. 4, 2018

(54) GEOSPATIAL ORIGIN AND IDENTITY BASED ON DIALECT DETECTION FOR TEXT BASED MEDIA

(71) Applicant: Babel Street, Inc., Reston, VA (US)

(72) Inventors: Jeffrey Chapman, Landsowne, VA (US); Shon Myatt, Starkville, MS (US); James B. Haynie, New Orleans, LA (US)

(73) Assignee: Babel Street, Inc., Reston, VA (US)

( * ) Notice: Subject to any disclaimer, the term of this patent is extended or adjusted under 35 U.S.C. 154(b) by 0 days.

(21) Appl. No.: 15/612,408

(22) Filed: Jun. 2, 2017

(65) Prior Publication Data

US 2017/0351657 A1 Dec. 7, 2017

Related U.S. Application Data

(60) Provisional application No. 62/345,437, filed on Jun. 3, 2016.

(51) Int. Cl.
*G06F 17/27* (2006.01)
*H04W 4/12* (2009.01)
(Continued)

(52) U.S. Cl.
CPC .......... *G06F 17/275* (2013.01); *G06T 11/206* (2013.01); *G06T 11/40* (2013.01); *H04W 4/12* (2013.01)

(58) Field of Classification Search
CPC .. G06F 17/30061; G06F 19/26; G06F 19/708; G06F 17/275; G10L 15/005; G06T 11/206
(Continued)

(56) References Cited

U.S. PATENT DOCUMENTS 8,583,432 B1 * 11/2013 Biadsy .................... G10L 15/18
 704/10
8,838,437 B1 * 9/2014 Buryak ................... G06F 9/454
 704/8

(Continued)

OTHER PUBLICATIONS

Katz et al., "How Y'All, Youse, and You Guys Talk", New York Times, Dec. 21, 2013, 36 Pages.*
(Continued)

*Primary Examiner* — Martin Lerner
(74) *Attorney, Agent, or Firm* — Wiggin and Dana LLP; Gregory S. Rosenblatt; Jonathan D. Hall

(57) ABSTRACT

A method for acquiring an author's geospatial location of origin from text based media through dialect detection. The method detects the dialect for a specified language using keywords, phrases, patterns, or gestures and identifies the geographical location for the author's origin or area of linguistic influence. The identified geospatial areas can include the overarching primary areas of use for the base language coupled with a smaller geographical area bounded according to, for example, state, country, region, or political, tribal, or societal influence, for the specified dialect, and produces a map to the user with a polygon depicting the probable area of origin or influence. In instances where more than one element of dialect detection is available (multiple keywords, phrases, patterns, gestures) the intersection of these individual polygons produce increasing areas of probability where the solution space can exist for the combination of identified dialect components.

11 Claims, 6 Drawing Sheets

(51) Int. Cl.
*G06T 11/40* (2006.01)
*G06T 11/20* (2006.01)

(58) Field of Classification Search
USPC ....... 704/1, 8, 9, 10, 276; 715/215, 275, 703
See application file for complete search history.

(56) References Cited

U.S. PATENT DOCUMENTS

| | | | |
|---|---|---|---|
| 9,286,643 B2* | 3/2016 | Reinders | G06F 17/30867 |
| 2003/0025696 A1* | 2/2003 | Mulgan | G06T 11/203 |
| | | | 345/440 |
| 2003/0088397 A1* | 5/2003 | Karas | G10L 15/005 |
| | | | 704/1 |
| 2008/0051989 A1* | 2/2008 | Welsh | G06T 11/00 |
| | | | 701/532 |
| 2008/0319990 A1* | 12/2008 | Taranenko | G06F 17/30241 |
| 2009/0112590 A1* | 4/2009 | Pulz | G10L 15/187 |
| | | | 704/246 |
| 2010/0082327 A1 | 4/2010 | Rogers et al. | |
| 2012/0215893 A1* | 8/2012 | Bisdikian | G06F 9/5011 |
| | | | 709/223 |
| 2012/0221553 A1* | 8/2012 | Wittmer | G06F 17/30572 |
| | | | 707/722 |
| 2015/0019531 A1 | 1/2015 | Bursey | |
| 2016/0170611 A1* | 6/2016 | Hao | G09B 29/007 |
| | | | 715/781 |
| 2017/0023369 A1* | 1/2017 | Mohler | G01C 21/30 |

OTHER PUBLICATIONS

Vaux et al., "Harvard Dialect Survey", 2003, 5 Pages.*
International Search Report and Written Opinion dated Aug. 16, 2017.

* cited by examiner

GEOSPATIAL ORIGIN AND IDENTITY BASED ON DIALECT DETECTION FOR TEXT BASED MEDIA

CROSS REFERENCE TO RELATED APPLICATION

This application claims priority to U.S. Provisional Patent Application No. 62/345,437, titled "Geospatial Origin and Identity Based On Dialect Detection for Text Based Media" and filed Jun. 3, 2016. The contents of U.S. 62/345,437 are hereby incorporated herein in their entirety.

FIELD OF THE DISCLOSURE

The subject matter of the present disclosure generally relates to dialect detection, and more particularly relates to determining an origin and/or area of influence of an author.

BACKGROUND

The majority of languages contain dialects. Specifically, for the purposes of this disclosure, dialect shall mean a regional variety of a language distinguished by features of vocabulary, grammar, and pronunciation from other regional varieties and constituting together with them a single language. Knowledge dialects can assist with identifying speakers or authors when they exhibit a particular community-shared linguistic trait. Keywords, phrases, patterns and gestures have associated geospatial properties that can reduce the solution space (geographical area) in determining a person's origin or areas that have influenced their vernacular. Geospatial properties may include regional, political, societal, tribal, or ethnic boundaries and could contain more than one of these characteristics.

Previous tools focused on dialect detection for improving translation accuracy with the majority of effort directed toward audio analysis. With respect to location services, the majority of efforts attempt to locate the current position of the actual author at the time of release. There is a lack of any tool for identifying an author's native origin or an area of linguistic influence over them based on the content of a text based communication.

Information on an author's origin can provide a greater understanding of the underlying thoughts of the author with respect to the content of their message. This knowledge can assist with creating a personality profile of the author that correctly places them into their community of interest. A more comprehensive appreciation for the communique is achieved by correlating the theme or message with the author's environmental influence.

BRIEF SUMMARY

Using language dialects and their associated geographical area of use can assist with the identification of the geospatial origin or the linguistic influence for a specified author. There is a wealth of information that can be gleaned from determining an author's origin or areas that have influenced them strongly.

The disclosed method and system can provide situational awareness as to the origin of an author or authors of a text communication based on keywords, phrases, patterns and gestures that are employed therein. This can assist with determining the location of the communication by deducing that the author is within their dialect region, determining the community of interest of the author, regional influences, or determining whether the author is attempting to pose as another person. The method includes identifying the language used in the communication and then searching for geospatial dialect identifiers (words, phrases, gestures) unique to the base language. Once the dialect identifiers are determined to be present within the communication, each component is matched with at least one associated geospatial polygon based on the dialect's area of use. The dialect polygons may be based on regional, political, societal, ethnic, tribal or other distinguishable boundaries. Next, the polygons are rendered on a map to visually display to the user the author's probable origin or area of influence. In instances where multiple dialect components are present in the communication, the intersection of the polygons can be highlighted to indicate areas as having a higher probability of being the author's place of origin or area of influence.

BRIEF DESCRIPTION OF THE DRAWINGS

The foregoing summary, preferred embodiments, and other aspects of the present disclosure will be best understood with reference to a detailed description of specific embodiments, which follows, when read in conjunction with the accompanying drawings, in which.

DETAILED DESCRIPTION

Disclosed is a method and system for ascertaining an author's geospatial location of origin or influence by detecting and analyzing dialect in text based media.

For the purposes of this application, the following definitions apply:

Keyword: A word that serves as a key, as to the meaning of another word, a sentence, passage, or the like. A word used by a group of persons that gives a geospatial context as to their origin or location due to its regional use.

Phrase: Characteristic, current, or proverbial expression that is geospatially specific for a group of persons.

Pattern: Distinctive style, model, or form. A set of words to include pictographic languages that in set sequence or structure defines the geospatial origin of the persons.

Gesture: Communication intended for effect or as a formality that is geospatially specific for a group of persons.

Figure 1:
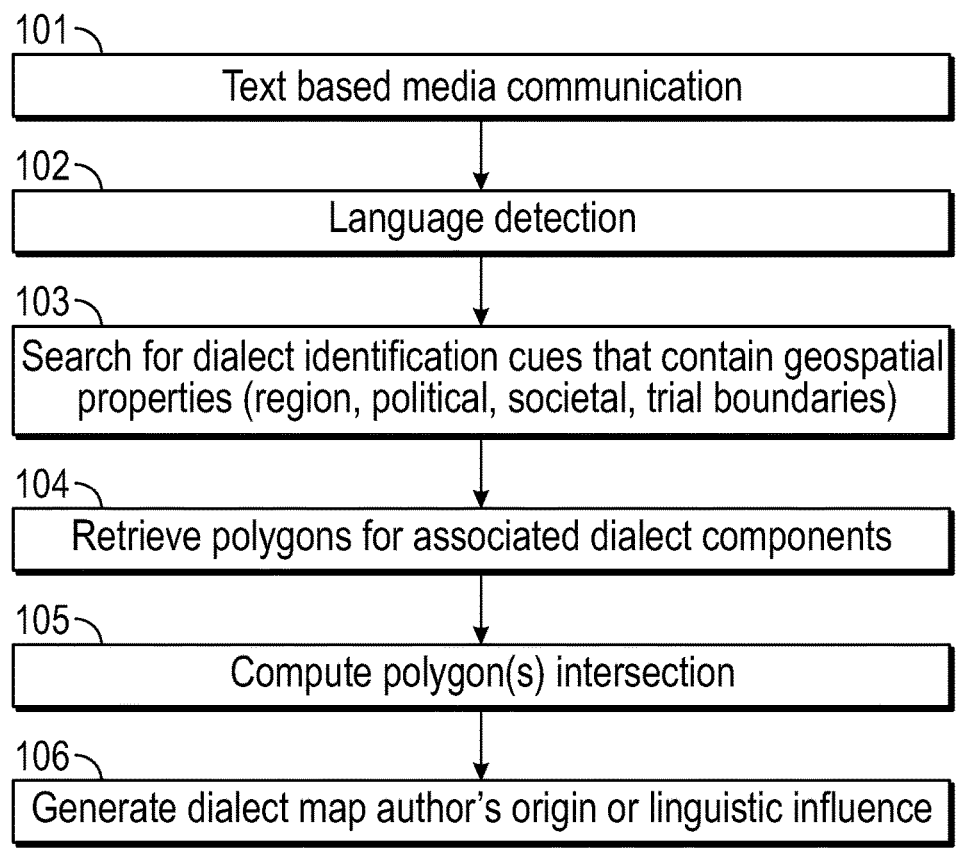
FIG. 1 is a flowchart of the steps of an embodiment.

With reference to FIG. 1, the process begins with text based media (101), from which it is determined the language used (102). Methods of determining the language used in text are well known in the art to which the present application pertains. In the event the language cannot be identified, for instance if there is insufficient writing or it is encrypted, the process may be ended. When the language is identified, the process proceeds to step 103.

In an example, the language of a text is identified as Serbo-Croatian. In step 103, the text is searched for dialect identifiers that may include words, phrases, or gestures that are contained in a database corresponding to the identified language (referred to in FIG. 2 as the Base Language Dialect Key Component Repository). Those of ordinary skill in the art will understand that the repository may include any non-transitory computer-readable storage medium such as, for example and without limitation, hard drives or hard drive space. If no dialect identifiers are present, the system will retrieve the polygon representing the coverage area for the base language and render this polygon on a base map for the user. Each polygon is a representation of a geospatial area, which may, for instance, follow the contours of a country or other governmental domain, or represent an area where a particular dialect is prevalent (irrespective of borders). FIG. 3 shows the generation of a geospatial map for the example, if no dialect identifier were detected. Particularly, polygon 301 is displayed where Serbo-Croatian is the primary language and polygon 302 is displayed where Serbo-Croatian is a secondary language. At this point the process would end as no dialect identifier was detected. Polygon 301 and 302 may be provided dark and light shading, respectively. Other means to indicate the relevant significance of polygons 301 and 302, such as different colors, shades of colors or hashing, etc. could be optionally employed.

For the sake of explanation, it is now assumed that, instead, dialect identifiers are in fact detected, and the process continues to step 104.

Figure 4:
FIG. 4 illustrates an example map of a dialect identifier polygon, illustrating the reduced solution space based on a detected regional dialect.

For each detected dialect component present in the text based communication, the system retrieves an associated polygon from the geospatial database. If only one dialect identifier is present, the system will render the associated polygon on a base map for the user. FIG. 4 illustrates this process, in which the example word "delati," meaning "to work," is detected. While this word is within the Serbo-Croatian vernacular, its use is confined to a small area within the overall base language represented by Slovenia and Western Croatia. Therefore, the use of this word within a text based communication would tend to identify the author as having originated from the shaded area or having linguistic influences from that region. Polygon 401 is overlaid on the map indicating the area where "delati" is used. An associated probability surface value, representing the ratio of surface area where the dialect is present compared to the surface area where the base language is spoken, can be calculated and displayed. A higher surface probability indicates that the author's area of influence or place origin is a relatively small area, which is useful information for interpreting the context of the text.

Figure 5:
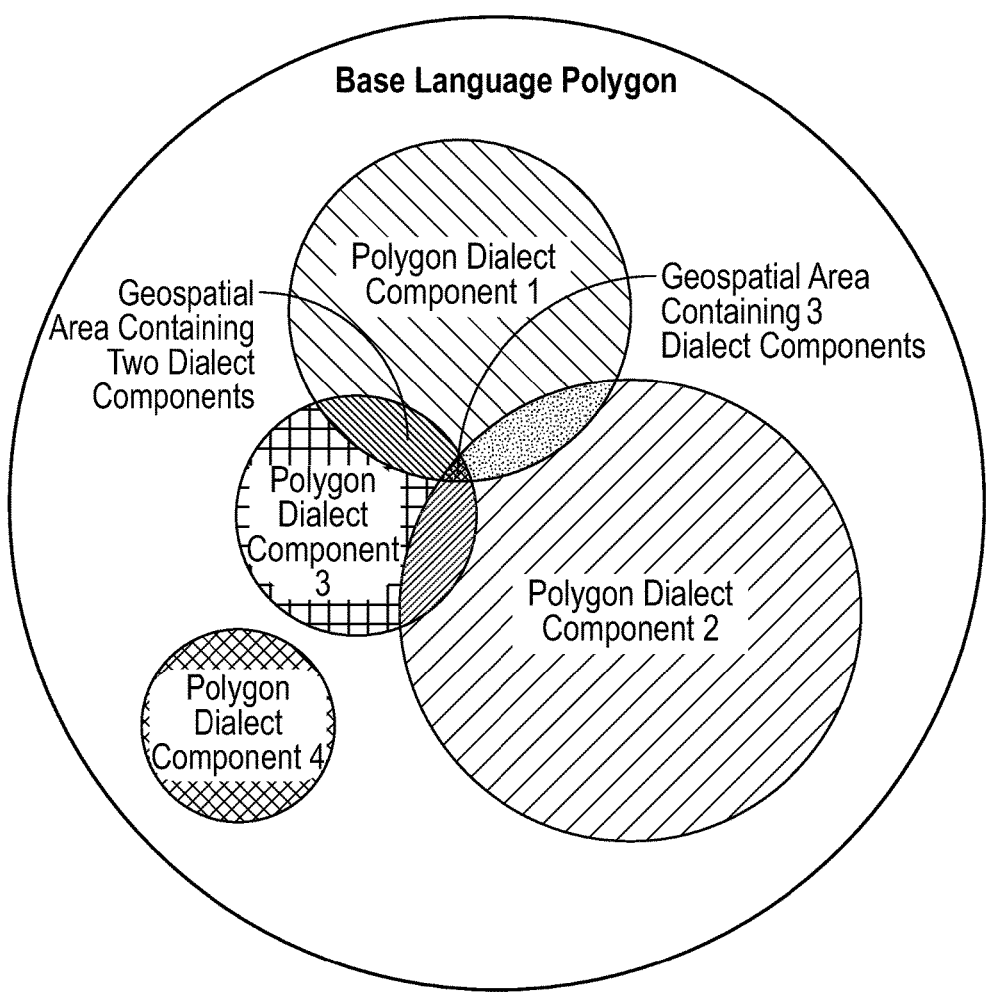
FIG. 5 illustrates an example of polygon layering where multiple polygons may exist in the same geospatial area for the same text communication and the highlighting of an intersection of the polygons.

In step 105, in instances where more than one dialect identifier is present, the system will layer multiple polygons on a base map and compute the overlap of the polygons to create highlighted regions where multiple components are spatially present simultaneously. The concept of two or more dialects representing both overlapping and non-overlapping regions present in a communication within a specified base language is illustrated in FIG. 5. The polygon result preferably adheres to Open Geospatial Consortium (OGC) standards of the OGC, which is based in Wayland, Mass. The OGC standards are a set of specifications governing the electronic processing of geospatial related information. The use of OGC standards makes the layering compatible with any mapping system using OGC complainant standards. Therefore, the system and method are not limited to a proprietary mapping system, but instead can be used to enhance existing and future Geospatial mapping services.

The more unique (geospatially compressed) a dialect, the greater its ability to provide a geospatial location for an author's origin or area of influence, compared to the general knowledge gained from the specified language's coverage area. The presence of multiple dialects that intersect further refines this process and increases the likelihood of a smaller geospatial solution set.

Figure 2:
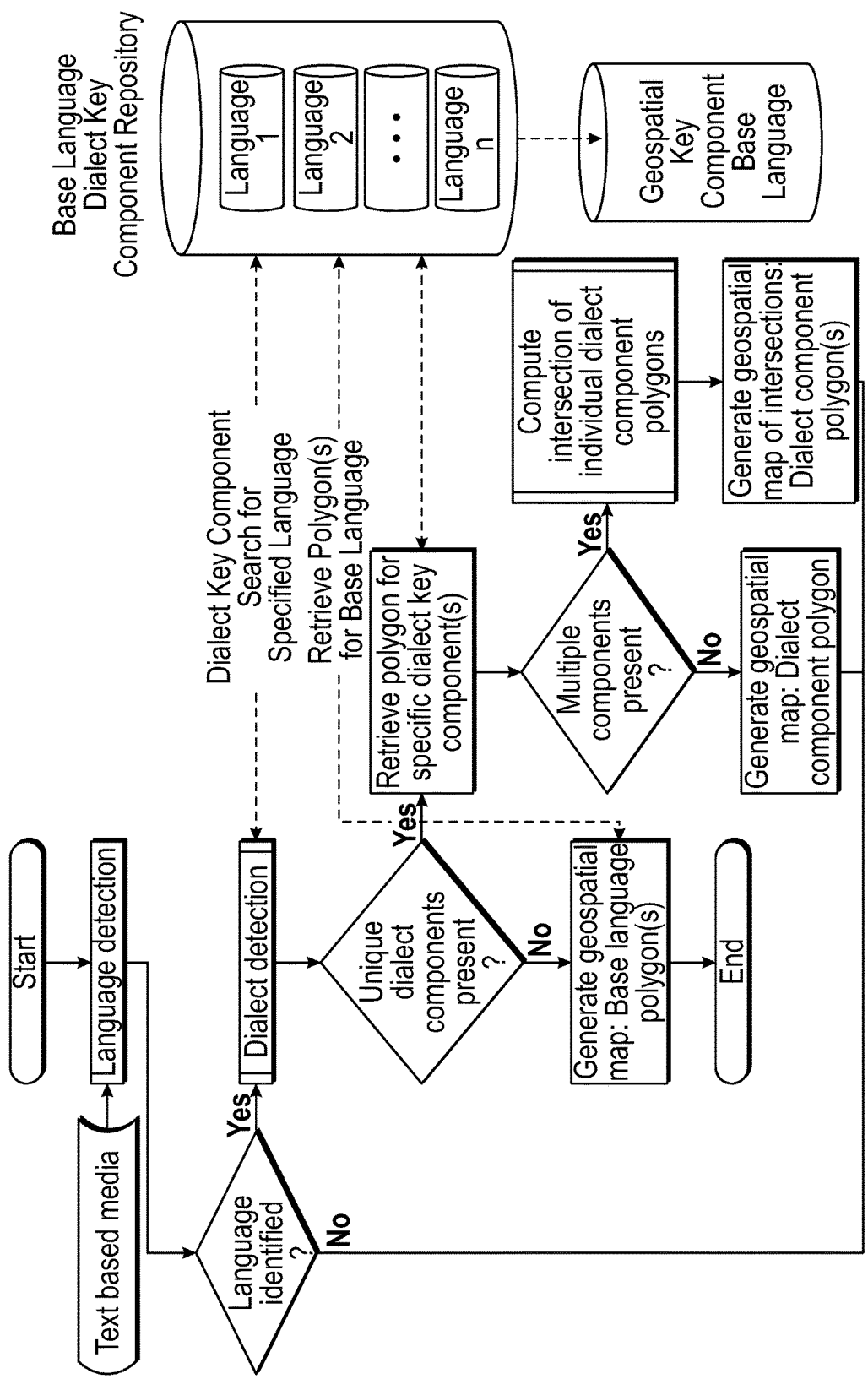
FIG. 2 is a conceptual flowchart an embodiment.
Figure 3:
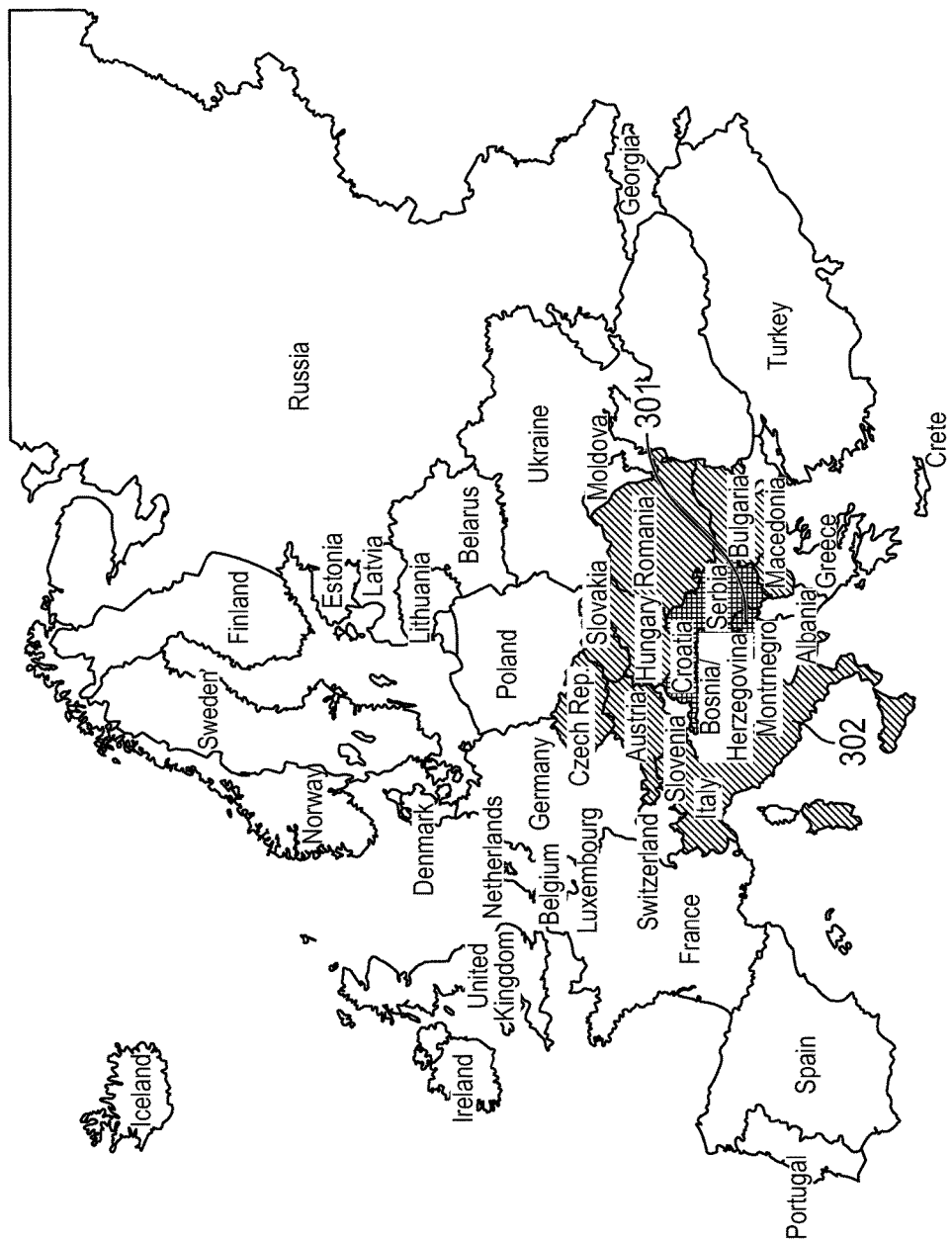
FIG. 3 illustrates an example of a map for a base-language polygon.

FIG. 2 depicts a flow chart of another embodiment. At the start, language detection is performed on text based media. If a language is identified, dialect detection is performed. If a unique dialect component is not present, a geospatial map for the base language is generated. If unique dialect component(s) are detected, the polygons for the specific dialect key components are retrieved from a base language dialect key component repository. If there are not multiple components present, a geospatial map is generated for the identified dialect component. If multiple components are present, the intersection of the dialect component areas is computed and a geospatial map of the intersections of the component areas is generated.

FIG. 5 is a conceptual diagram of the size and location, relative to one another, of various polygons corresponding to dialect identifiers. Each represents a geospatial area, though all the Polygons are related to a single base language. Some polygons are larger as their associated dialect identifier is indicative of a larger geospatial region in which a dialect is present. Where two dialect indicators indicate two geospatial areas that share some amount of space, the polygons will intersect and the intersecting area made more prominent to indicate a higher likelihood that the author is from that area. As more dialect indicators allow the inclusion of more polygons, the intersecting space can narrow down the area of influence or origin of the author to a smaller geospatial area.

Figure 6:
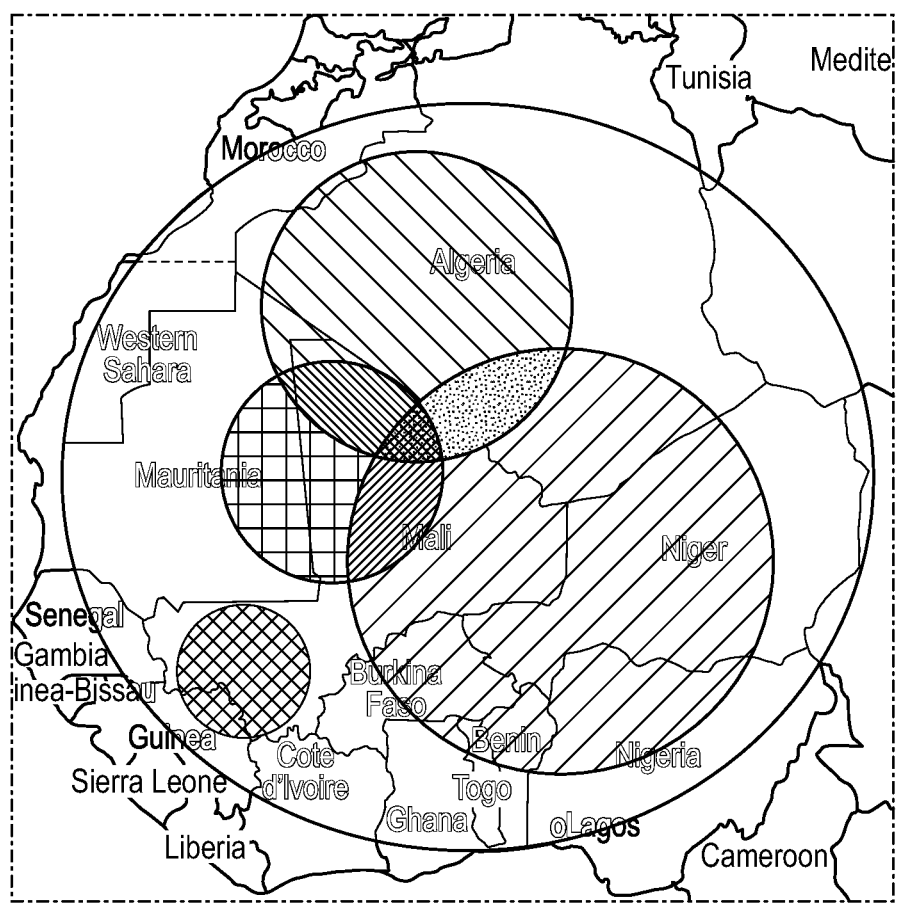
FIG. 6 illustrates an example of probability surface overlaid on a map indicating increasing areas of probability for the authors' origin or region(s) of influence.

FIG. 6 is a depiction of the diagram of FIG. 5 as layered on a map, as could be presented on a display. The overlap between the polygons for dialect components 1, 2 and 3 is shaded or otherwise indicated as having a high likelihood as being the origin or area of influence for the author. In contrast, for example, the area corresponding to the polygon associated dialect component 2, but not overlapping with the polygons associated with any other dialect components, is shaded or otherwise is indicated as being less likely to be the origin or an area of influence for the author.

Described now are conditional algorithms which may be employed to produce a probability surface for display as a geospatial layer.

Assumptions
1. Smaller dialect polygons possess a high influence for identifying origin or area of influence by reducing the solution space of probable locations.
2. The base language polygon contains all possible dialect polygons for the specified language.
3. The area within the intersection of two or more dialect polygons indicates a higher probability for detecting origin or area of influence than individual polygons.
4. The area within the intersection is equal to or smaller than the individual dialect polygons.

Algorithm

In an embodiment, generating the probability surface is a function of the area contained within the dialect polygon divided by the area contained within the base language polygon subtracted from 1. This will produce an inverse relationship where a smaller dialect area compared to the base language area will generate a higher detection probability. With the following formula applied for non-intersecting dialects for determining probability:

$$P_{ij} = 1 - \frac{d_{ij}}{lj}$$

Where
- $P_{ij}$—Probability surface value for the area contained by dialect polygon i for language j
- lj—Area contained within language polygon j
- $d_{ij}$—Area contained by dialect polygon i for language j
- i=1 . . . n (dialect polygons available within a language)
- j=1 . . . m (language polygons available)

For areas not containing a dialect polygon the probability is zero (0).
- i=0 (no dialects present within a region or area of the base language)
- $P_{0j}$=0 where no dialects are present for language j or within an area of language j Where intersections exist, the probability at a given point within the intersection is the area contained divided by the base language polygon area subtracted from 1. Referencing FIG. 5, intersections of Dialect Polygons: 1 with 2, 2 with 3, 1 with 3, and the intersection of 1, 2, 3 are combined.

$$P_{ij} = 1 - \frac{\bigcap_{i=1}^{n} d_{ij}}{l_j}$$

In the embodiment, once complete with the calculation for the probability surface, the values for each point follow a color pallet representing increasing probability. With reference to FIG. 6, the probability surface is overlaid on a map and indicates the possible areas of the author's origin or influence. Shading darkness or other criteria may be alternatively used to indicate probability surface.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed:

1. A method of determining the origin or an area of influence of an author, comprising:
   providing a repository including non-transient computer readable storage medium;
   storing on the repository a plurality of areas, each area corresponding to a geospatial area in which a dialect is prevalent;
   storing on the repository a plurality of dialect components each associated with a language and one of the areas;
   receiving a text communication;
   determining the language of the text communication;
   identifying at least one dialect component associated with the language of the text communication is present in the text communication;
   retrieving the area to which the identified dialect component is associated;
   calculating a probability surface value according to $$P_{ij} = 1 - \frac{\bigcap_{i=1}^{n} d_{ij}}{l_j}.$$

where $P_{ij}$ is a probability surface value for the area contained by dialect polygon i for language j, $l_j$ is an area contained within language area j, $d_{ij}$ is an area contained by dialect area i for language j, and ∩ represents intersection; and
   presenting representations of the retrieved areas and the probability surface value on a display.

2. The method of claim 1, wherein the step of identifying at least one dialect component includes identifying at least two dialect components associated with the language of the text communication is present in the text communication;
   wherein the areas to which the identified dialect components are associated is at least two areas; and
   wherein the step of presenting includes presenting representations of the retrieved areas on the display.

3. The method of claim 2 wherein the representations are geospatial representations on a map.

4. The method of claim 3 wherein the representations are shading on a map.

5. The method of claim 1 wherein the shading is more prevalent in geospatial areas where the areas overlap.

6. The method of claim 1 wherein a probability surface value is calculated and presented on the display.

7. A system for determining the origin or an area of influence of an author, comprising:
   a repository including non-transient computer readable storage;
   the repository having stored therein a plurality of areas, each area corresponding to a geospatial area in which a dialect is prevalent;
   the repository further having stored therein a plurality of dialect components each associated with a language and one of the areas;
   a display; and
   a processor in communication with the repository and configured to:
      receive a text communication,
      determine the language of the text communication,
      identify at least one dialect component associated with the language of the text communication is present in the text communication,
      retrieve from the repository the area to which the identified dialect component is associated;
   calculate a probability surface value according to $$P_{ij} = 1 - \frac{\bigcap_{i=1}^{n} d_{ij}}{l_j}.$$

where $P_{ij}$ is a probability surface value for the area contained by dialect area i for language j, $l_j$ is an area contained within language area j, $d_{ij}$ is an area contained by dialect polygon i for language j, and ∩ represents intersection; and
   present both representations of the retrieved areas and the probability surface value on the display.

8. The system of claim 7 wherein the representations are geospatial representations on a map.

9. The system of claim 8 wherein the representations are shading on a map.

10. The system of claim 9 wherein the shading is more prevalent in geospatial areas where the areas overlap.

11. The system of claim 7 wherein the processor is configured to calculate a probability surface value and present it on the display.

* * * * *